United States Patent
Rogers et al.

(10) Patent No.: US 8,270,441 B2
(45) Date of Patent: Sep. 18, 2012

(54) VERY HIGH POWER PULSED FIBER LASER

(75) Inventors: Philip Rogers, Hume, VA (US);
Priyavadan Mamidipudi, Bristow, VA (US); Rupak Changkakoti, Haymarket, VA (US); Peter Gatchell, Nokesville, VA (US)

(73) Assignee: Optical Air Data Systems, LLC, Manassas, VA (US)

( * ) Notice: Subject to any disclaimer, the term of this patent is extended or adjusted under 35 U.S.C. 154(b) by 0 days.

(21) Appl. No.: 12/815,057

(22) Filed: Jun. 14, 2010

(65) Prior Publication Data

US 2010/0253998 A1    Oct. 7, 2010

Related U.S. Application Data

(63) Continuation of application No. 10/581,416, filed as application No. PCT/US2004/040572 on Dec. 6, 2004, now Pat. No. 7,738,514.

(60) Provisional application No. 60/526,613, filed on Dec. 4, 2003.

(51) Int. Cl.
*H01S 3/30* (2006.01)
*H01S 3/00* (2006.01)

(52) U.S. Cl. ......... 372/6; 359/343.1
(58) Field of Classification Search ........... 372/6, 29.02; 359/341.1–341.4
See application file for complete search history.

(56) References Cited

U.S. PATENT DOCUMENTS

| | | | |
|---|---|---|---|
| 5,694,408 A | 12/1997 | Bott et al. | |
| 5,835,199 A | 11/1998 | Phillips et al. | |
| 5,847,863 A * | 12/1998 | Galvanauskas et al. | ... 359/341.3 |
| 5,864,644 A | 1/1999 | DiGiovanni et al. | |
| 5,933,271 A | 8/1999 | Waarts et al. | |
| 6,181,463 B1 | 1/2001 | Galvanauskas et al. | |
| 6,200,309 B1 | 3/2001 | Rice et al. | |
| 6,208,458 B1 * | 3/2001 | Galvanauskas et al. | ...... 359/345 |
| 6,275,250 B1 * | 8/2001 | Sanders et al. | ............. 347/247 |
| 6,347,007 B1 | 2/2002 | Grubb et al. | |
| 6,366,356 B1 | 4/2002 | Brosnan et al. | |
| 6,430,343 B1 * | 8/2002 | Arney et al. | .................... 385/48 |
| 6,590,698 B1 | 7/2003 | Ohtsuki et al. | |
| 6,678,288 B2 | 1/2004 | Rice | |
| 6,781,672 B2 | 8/2004 | Motegi | |
| 7,738,514 B2 | 6/2010 | Rogers et al. | |
| 2002/0191171 A1 | 12/2002 | Nishi | |
| 2003/0156605 A1 | 8/2003 | Richardson et al. | |
| 2005/0185683 A1 * | 8/2005 | Ohtsuki | ......................... 372/26 |
| 2005/0190802 A1 * | 9/2005 | Richardson et al. | ............ 372/25 |
| 2006/0029111 A1 * | 2/2006 | Liu | ................................. 372/6 |

OTHER PUBLICATIONS

XP-002339906: "PM double-clad fibers for high power lasers and amplifiers" by Kanishka Tankala et al.; *Advances in Fiber Devices*; vol. 4974 (2003).

XP-002461089; "27-mJ nanosecond pulses in $M^2$=6.5 beam from a coiled highly multimode Yb-doped fiber amplifier" by M.-Y. Chen et al.; *Conference on Lasers and Electro-Optics (CLEO)*; vol. 1 (2004).

(Continued)

*Primary Examiner* — Jessica Stultz
*Assistant Examiner* — Phillip Nguyen
(74) *Attorney, Agent, or Firm* — Sterne, Kessler, Goldstein & Fox, PLLC

(57) ABSTRACT

A high power integrated fiber laser system includes cascaded amplifiers that utilize low numerical aperture fiber amplifiers. The system is rugged and lightweight.

12 Claims, 6 Drawing Sheets

OTHER PUBLICATIONS

International Search Report, dated Oct. 4, 2006, for PCT Appl. No. PCT/US2004/040572, filed Dec. 6, 2004, 1 page.

International Preliminary Report on Patentability, dated Nov. 1, 2006, for PCT Appl. No. PCT/US2004/040572, filed Dec. 6, 2004, 4 pages.

Limpert, J. et al., "100-W average-power, high-energy nanosecond fiber amplifier," *Applied Physics B—Lasers and Optics 75*, pp. 477-479 (May 8, 2002).

Renaud, C.C. et al., "7.7 mJ pulses from a large core Yb-doped cladding pumped Q-switched fibre laser," *Technical Digest, CTuQ5, CLEO '2001*, Baltimore, MD, 2 pages (2001).

Non-Final Rejection mailed Jan. 8, 2008 for U.S. Appl. No. 10/581,416, filed Jun. 2, 2006; 6 pages.

Final Rejection mailed Oct. 8, 2008 for U.S. Appl. No. 10/581,416, filed Jun. 2, 2006; 10 pages.

Non-Final Rejection mailed May 13, 2009 for U.S. Appl. No. 10/581,416, filed June 2, 2006; 9 pages.

Notice of Allowance mailed Feb. 5, 2010 for U.S. Appl. No. 10/581,416, filed Jun. 2, 2006; 7 pages.

Supplementary European Search Report directed to related European Patent Application No. 04 817 945.1-222, mailed Apr. 18, 2008, from the European Patent Office; 5 pages.

Examination Report directed to related European Patent Application No. 04 817 945.1-2222, mailed Jun. 5, 2009, from the European Patent Office; 5 pages.

Examination Report directed to related Canadian Patent Application No. 2,549,172, mailed Nov. 2, 2009, from the Canadian Intellectual Property Office; 3 pages.

Notice of Allowance directed to related Canadian Patent Application No. 2,549,172, mailed Jun. 3, 2010, from the Canadian Intellectual Property Office; 1 page.

Examination Report directed to related European Patent Application No. 04 817 945.1-2222, mailed Nov. 9, 2011, from the European Patent Office; 4 pages.

\* cited by examiner

VERY HIGH POWER PULSED FIBER LASER

CROSS REFERENCE TO RELATED APPLICATIONS

This application is a Continuation of U.S. application Ser. No. 10/581,416, filed Jun. 2, 2006 (now U.S. Pat. No. 7,738,514), which is the National Phase Entry of International Application No. PCT/US2004/040572 filed on Dec. 6, 2004, which claims benefit of U.S. Provisional Application No. 60/526,613, filed Dec. 4, 2003.

TECHNICAL FIELD

This invention relates to the art of high-power fiber lasers. In particular, the invention relates to the art of high-power, fully integrated fiber laser systems.

BACKGROUND ART

Optical fiber amplifiers that receive coherent light of relatively low power from a seed laser and amplify that light with fiber laser amplifiers are known. When the systems are to be used for such applications as target marking, target ranging, imaging, and tracking, and LIDAR, among others, a primary objective has been to obtain a high-power, single mode output, or output with relatively low multimode content. This is particular difficult because of the necessity of controlling amplified spontaneous emission (ASE), controlling the excitation of unwanted modes, and reducing the effects of non-linearity. One technique that has been proposed includes that of cascaded, pulse-pumped amplifiers where pumping is synchronized with the pulse to be amplified. Such a system is shown in U.S. Pat. No. 5,933,271. This is however limited to relatively low pulse peak powers when compared to conventional solid state lasers that are capable of peak powers in the hundreds of kilowatts to megawatts.

SUMMARY OF THE INVENTION

Increase in the power of a near diffraction-limited CW beam generated from doped (Yb, Er, Yb:Er, Nd etc.) fiber lasers constitutes an important advancement, because this fiber technology is uniquely efficient and providing fully integrated fiber laser systems. Achieving high pulse energies with pulsed fiber lasers is a much more formidable problem, and the successful solution as described herein leads to a number of practically important applications. Difficulty in scaling pulse energies arises from the limited size of the fiber core and the relatively long pulse propagation length necessary to achieve high gain. Peak powers within fiber-based amplifier systems are further limited by non-linear phenomena within the fiber. Increasing the size of the core appears to be one of the main directions of the technological advancement towards higher energies. This scaling, however, can result in a highly multimode core and, consequently, to significant degradation of the beam quality.

The present invention relates to the generation of greater than 50-mJ, 10-ns pulses, with a total peak power of 5 MWatts. Another aspect of the invention is that the mode quality of a highly multimode, large-core fiber can be significantly improved by using the mode-filtering effect of a coiled, low-NA core. The invention uses a coiled fiber of about 115-µm diameter and low numerical aperture core, which supports a large number of transverse modes, to produce low divergence output beam with $M^2$ between 6 and 8 and preferably 6.5, thus effectively reducing number of modes at the output of the fiber to a small number of modes. The numerical aperture of the fiber is preferably between 0.06 and 0.08 and is more preferably about 0.07. The diameter of the coil is preferably about nine to eleven inches and more preferably about 10 inches. Effective numerical apertures of 0.04 for the beam can be achieved with such fiber amplifiers.

The preferred arrangement comprises an all-fiber, cascaded four amplifier system seeded with an electric-pulse-driven, single-longitudinal-mode diode laser emitting at 1064 nm. This arrangement allows for a very high power, pulsed, laser source tunable from 1030 nm to 1085 nm. Such seeding enables control of both the shape of the seed pulse and its repetition rate, which is selectable by the electric-pulse generator in the range from a single shot to 1 MHz. (It may not be possible to use pulse pumping at seed pulse frequencies approaching 1 MHz. At the higher frequencies, the pumping is preferably continuous.) Seed pulses as low as 10-30 nJ are amplified in a single-mode, core-pumped Yb-doped fiber preamplifier, having standard optical components and pumped with telecom-grade 980-nm single-mode diodes. For pulse repetition rates in the range from 10 Hz to 100 Hz, up to 500 nJ has been obtained in the preamplifier stage. These pulses are then launched into a cladding-pumped 10-µm diameter core Yb-doped fiber amplifier with a 125 µm cladding to produce up to 50 µJ per pulse. Isolation from ASE is achieved by the use of optical isolators, electro-optical time gates, and narrow bandpass filters at 1064 nm to suppress 1039-nm peak ASE emission between the stages. ASE is also limited by the use of pulse pumping that is timed with the pulses to be amplified. Previous systems have relied on the ability to use large average powers of the seed signal to overcome issues of spontaneous emissions with the amplifiers. This, however, has limited the ability to develop fiber laser amplifiers at low pulse repetition frequencies.

The output from the second preamplifier stage is then divided into a plurality of channels. As many as seven channels have been demonstrated. This preferably is accomplished by directing the output from the preamplifier into a series of splitters. Each of the outputs from the splitters is directed to a mode field adaptor that couples the light pulse to the first stage of a clad pumped fiber laser power amplifier. The first stage of the power amplifier preferably comprises a coiled gain fiber having a 30 µm core and a 250 µm cladding.

The fiber amplifiers of the first stage of the power amplifier are pulse pumped. The pulsed pumping light is directed into the amplifier cladding by the use of a tapered fiber bundle. Tapered fiber bundles are known, and those used in the preferred embodiment of the invention are manufactured to minimize loss and suppression of unwanted modes. Tapered fiber bundles can be effectively used as a means of stripping off unwanted higher order modes generated within the gain medium.

The output from each of the first stage power amplifier fibers is directed to a fiber laser amplifier of the second stage of the power amplifier. The fiber laser amplifiers of the second stage of the power amplifier are also pulse pumped by directing the pumping light into a tapered fiber bundle, which couples the pump light into the cladding of the fiber of the second stage of the power amplifier.

The second power amplifier stage utilizes a clad gain fiber having a 115 µm core diameter and a 350 µm cladding. The final power amplifier stage is based on a large core, double-clad 3-5 m long Yb-doped fiber with 115-µm diameter, low numerical aperture core as defined above, and 600-µm diameter, 0.46 NA inner pump cladding. The amplifier was end-pumped with 915-nm diode laser.

Amplified signals generated within the various channels of the system can be re-combined with one another to further enhance the peak power of the amplifier. This is achieved by controlling the signal and pump pulse timings within the various parallel legs of the system. It will be appreciated that the invention provides nanosecond pulse energies in the tens of millijoules range with very large core fibers. Large core dimensions ensure significant extractable pulse energies as well as increased susceptibility to detrimental nonlinear and bulk damage effects. Mode quality can be significantly improved by using coiled, low NA fibers to ensure loss for higher order transversal modes.

It is an object of this invention to provide a high power fiber laser amplifier.

It is a further object of this invention to provide a fully integrated high power fiber laser amplifier.

It is yet another object of this invention to provide a high power fiber laser system having one or more fiber amplifier stages using coiled low numerical aperture clad fiber amplifiers and tapered fiber bundles to provide pump energy to the amplifier cladding.

DETAILED DESCRIPTION OF THE PREFERRED EMBODIMENTS

In the preferred embodiment, the invention is an all-fiber, integrated laser system that is capable of producing very high peak power. The system is rugged and lightweight, which means that it is particularly useful for use in portable instruments used in severe environments, such as military high vibration and shock applications. One such use is that of laser targeting. Other potential applications include aircraft systems, space based systems, as well as commercial platforms (material processing, welding, laser surgery) where precise control over pulse widths, pulse shapes, pulse repetition frequencies, peak powers, and high electrical to optical conversion efficiencies can provide the user with immense advantages. Typical solid state laser systems lack such abilities of wavelength tenability, pulse control, as well as precision pointing which are possible with a fiber amplifier demonstrating comparable peak powers and mode content. This design for fiber amplifiers is not limited to this wavelength of 1064 nm, and holds true for fiber amplifier systems ranging from the near ultraviolet to the infrared.

Figure 1:
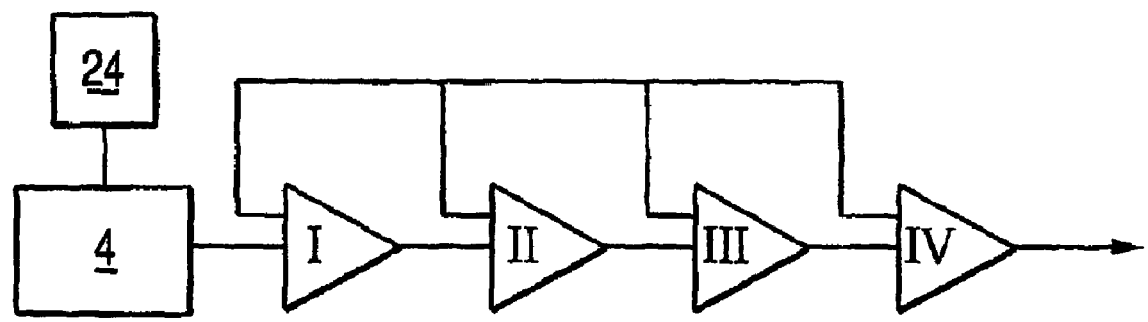
FIG. 1 is a block diagram of the overall design of the preferred embodiment.

FIG. 1 is a block diagram showing the overall design of an all-fiber, integrated laser system in accordance with the invention. The system includes a pulsed laser 4 that providing a seed signal to a cascaded set of fiber laser amplifiers, illustrated at I, II, III, and IV. The laser amplifiers are preferably pulse pumped, and the timing of the pumping is controlled by control circuit 24. The individual amplifier stages will be described in more detail in connection with FIGS. 2 through 5.

Figure 2:
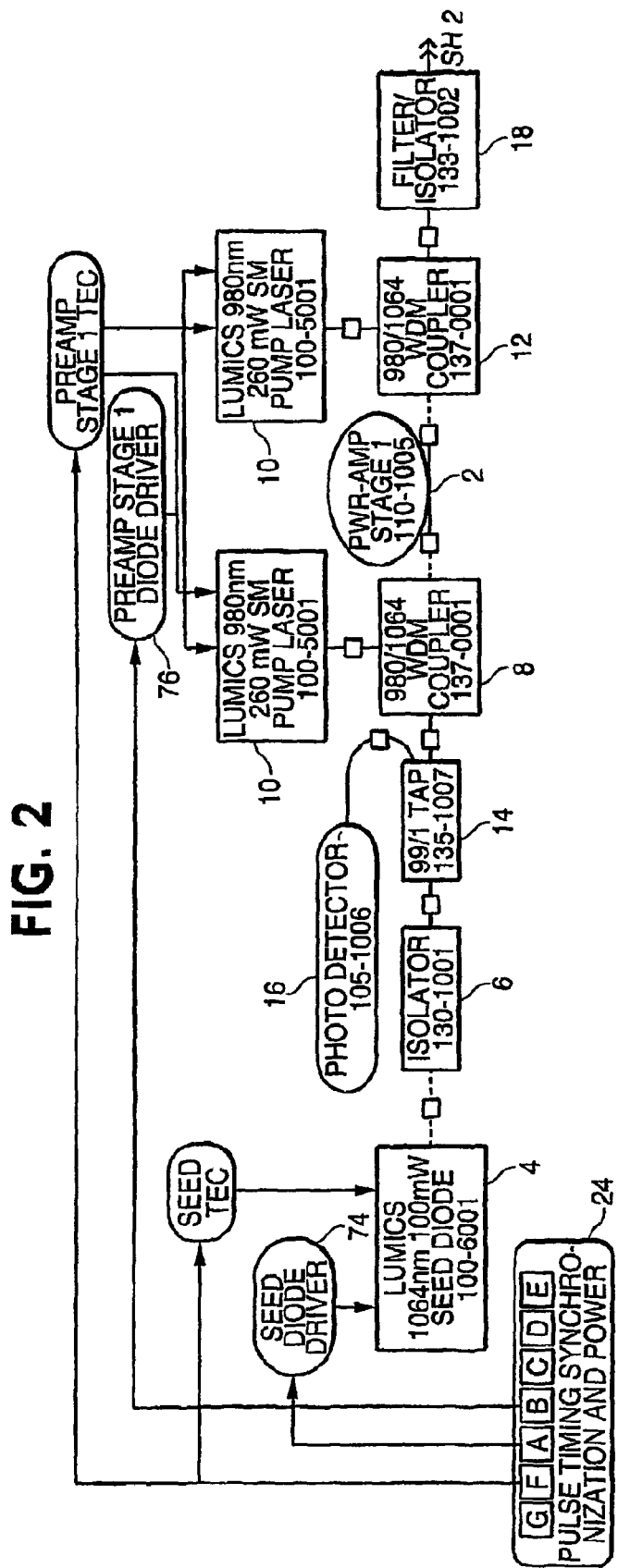
FIGS. 2-5 are schematic diagrams of a four stage integrated laser fiber amplifier in accordance with the invention.

FIG. 2 is a schematic diagram of the first stage of a preamplifier in accordance with a preferred embodiment of the invention. The embodiment shown in FIG. 2 comprises a first stage preamplifier that is generally of MOPA configuration and uses a coiled, single mode fiber amplifier 2 to amplify the seed pulse from a pulsed laser diode 4. The seed laser is a known diode laser capable of operating at a wavelength of 1064 nm. The output pulse from the seed laser 4 is fiber coupled and directed to an optical isolator 6, such as a polarization dependent isolator known in the art. Light from the isolator is coupled to the fiber amplifier by a wavefront division multiplexer (WDM) 8. The WDM 8 also couples pump light from a pump laser 10 into the fiber amplifier 2 in a first direction. A second WDM 12 directs light from a second pump laser 10 into the fiber amplifier 2 from the opposite direction. The WDM's also prevent backward traveling ASE from the amplifier to the 980 nm pumps and avoid terminal damage. The pump laser preferably operates at 980 nm and 200 mW and is a single mode solid state laser controlled by a timing circuit 24, as will be described in more detail below.

Each of the components to be described herein is optically connected to one or more other components by coupler fibers to provide the fully integrated laser fiber system. The coupler fibers are shown in the drawings by solid or broken lines as is conventional, and splices between individual fibers are indicated by squares.

To provide measurement of the power in the system, a tap 14 is used to direct a small amount of the seed laser energy to a photodetector 16. Additional taps may also be provided as will be described.

Fiber amplifier 2 is preferably 6 μm in core diameter, Yb doped single mode fiber of 15-20 meters in length.

The amplified light pulse is directed to the second stage of the system (FIG. 3) through a filter isolator 18 containing a narrow band filter to suppress ASE noise to transmit into the amplifier.

Figure 3:
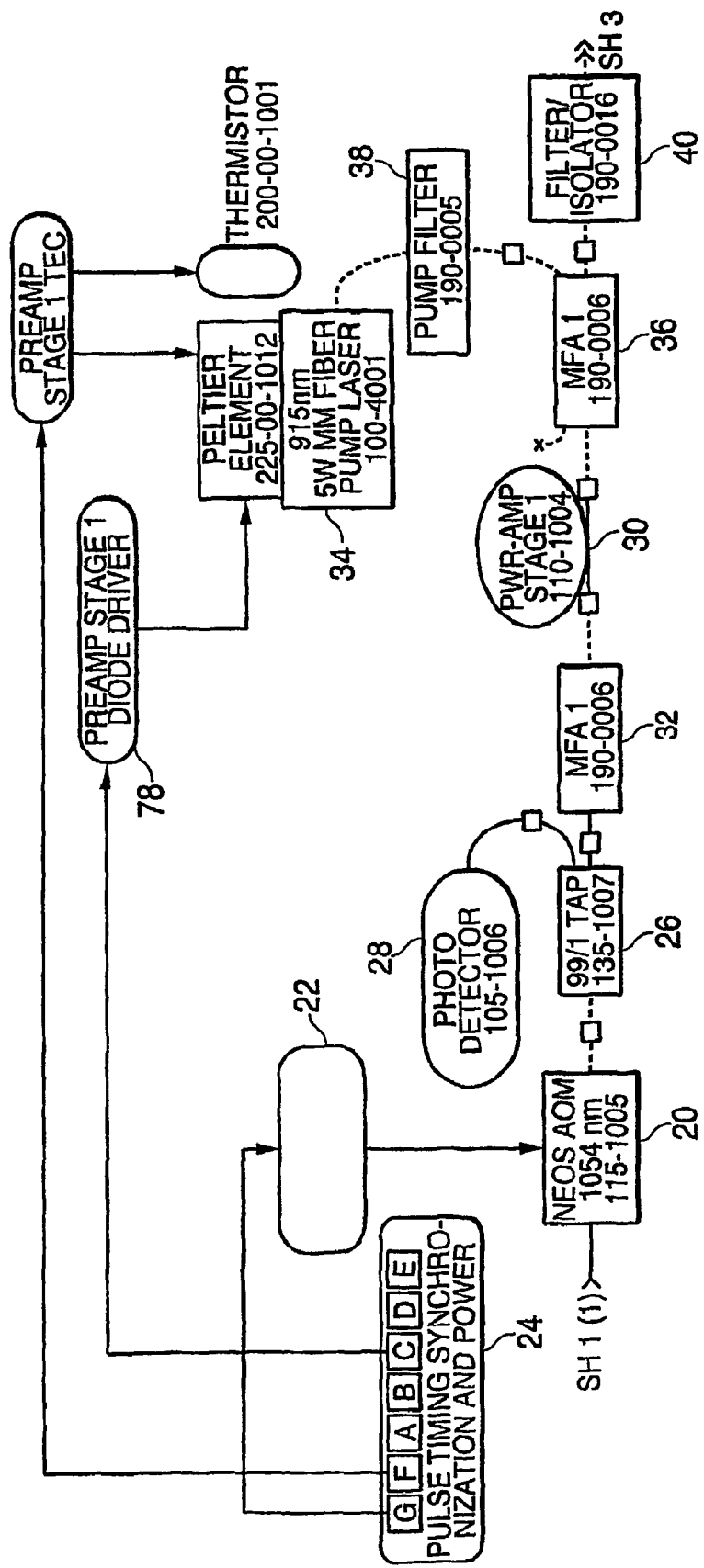

FIG. 3 shows the second stage of a preamplifier in accordance with the invention. The amplified light obtained from the first stage of the preamplifier shown in FIG. 2 is directed to the input of an acoustic optical modulator (AOM) 20, which acts as a time gated filter to eliminate unwanted wavelengths. AOM 20 is preferably tuned to the pulse frequency of the seed laser. The AOM 20 is operated by a RF driver 22, which is in turn controlled by control circuit 24. The control circuit controls the operation of the several elements by providing control signals to the seed laser, the pump lasers, and other components in the system. A tap 26 and photodetector 28 may be provided in this stage also.

The second stage of the preamplifier comprises a coiled, clad-pumped fiber amplifier 30. This fiber amplifier is preferably of 10 μm core diameter and 125 μm cladding. Light from the first preamplifier stage is transmitted from the AOM filter to second stage of the preamplifier by a mode field adaptor (MFA) 32, which matches the modes passed through the AOM to the fiber amplifier 30 for further amplification.

The fiber amplifier 30 is clad pumped by directing pulsed pump light from a pump laser 34, to the cladding of the amplifier 30 through a 2×2 coupler 36. The pump light is transmitted through a short wave pass filter to prevent the forward traveling ASE and signal from damaging the pump laser. In the preferred embodiment, the pump is a 915 nm, 5 W multimode fiber coupled pump source.

Amplified light from the fiber amplifier 30 is directed to the power amplifier stages through a filter/isolator 40 comprising a 5 nm narrow band 1064 nm filter.

Figure 4:
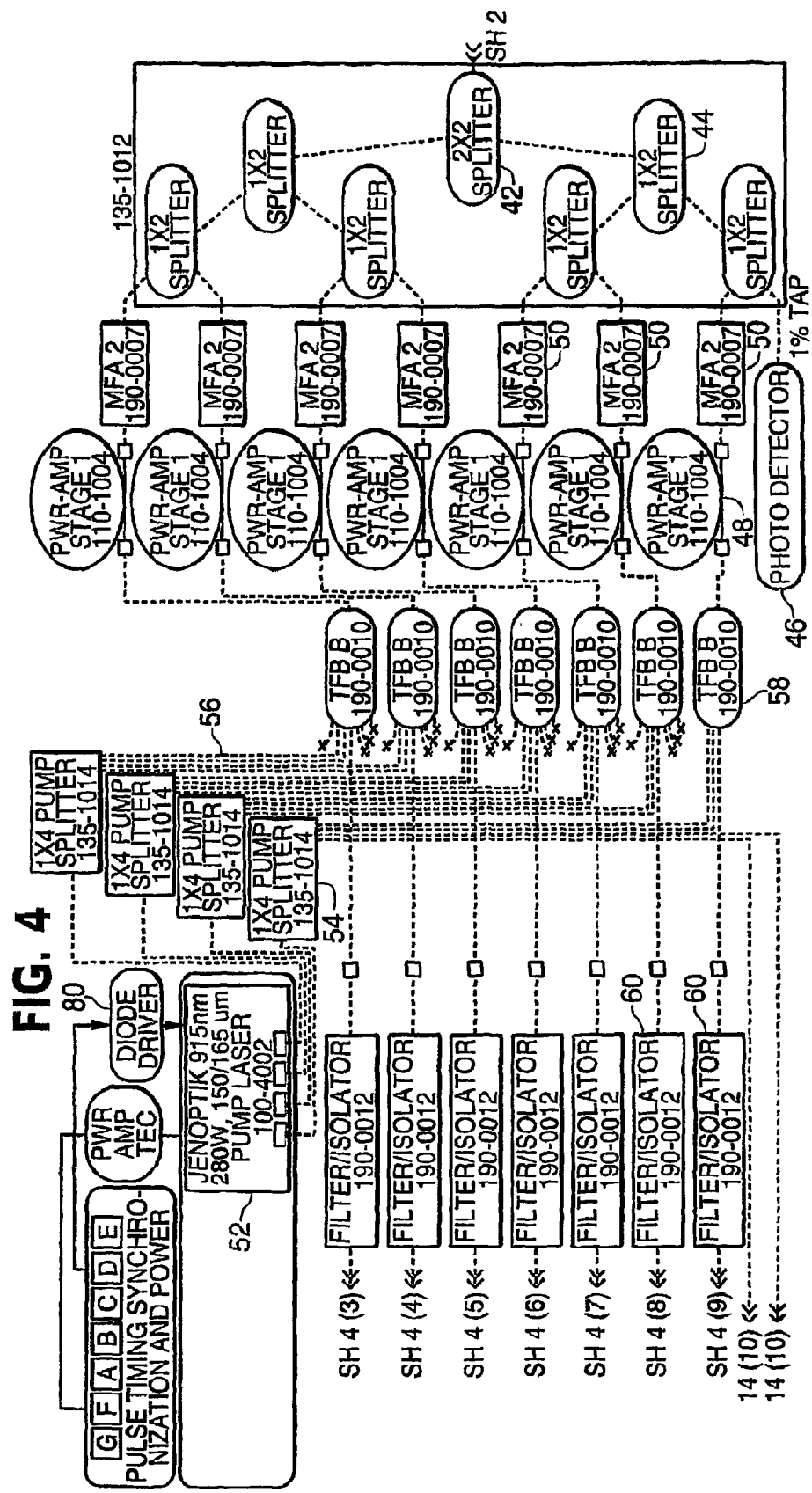

Referring now to FIG. 4, the light signal from the second stage of the preamplifier as illustrated in FIG. 3 is directed to the first stage of a power amplifier. The light is first directed to a number of splitters for dividing the light into a plurality of channels. In the embodiments shown, the light from the preamplifier is divided among seven channels. The first splitter 42 is a 2×2 splitter that divides the incoming light into two parts of approximately equal power. The remaining splitters 44 are preferably 2×1 splitters that divide the light into seven beams of approximately equal power and an eighth beam of about 1% for power monitoring by photodetector 46. By this arrangement, the light from the preamplifier is divided into several parallel channels for simultaneous amplification while maintaining the desired qualities of the beam, namely low mode and high power. It will be understood that more or fewer than seven channels may be used.

Each output from a splitter 44 is directed to a first-stage fiber laser power amplifier 48 through a mode field adaptor 50. In this stage, the laser power amplifier is preferably clad pumped amplifier having a 30 μm core diameter and a 250 μm cladding diameter. The fiber is coiled to suppress unwanted modes.

It will be appreciated that a feature of the invention is that the core diameter of the fiber amplifier increases in each subsequent stage. Thus, the core diameter in the preamplifier stage 2 is 10 μm, the core diameter in the first power amplifier stage is 30 μm, and the diameter in the second power amplifier stage is 115 μm. Mode field adaptors 50 are provided to match the 10 μm fibers from splitters 44 to the 30 μm core of the amplifiers 48 to provide mode control.

Each of the fiber amplifiers is pulse pumped by pumping laser 52, which is a diode laser preferably operating at 915 nm and total power of 200 watts with each fiber having 50 watts. The several fiber laser amplifiers 48 are provided with light from the pump laser by dividing the light from the pump laser among several fibers 56 by splitters 54. Pump light from laser is directed into the cladding of the fiber amplifiers 48 through tapered fiber bundles (TFB) 58.

Amplified light output from the fiber amplifiers 48 is directed to the final stage of amplification through filter/isolators 60.

Figure 5:
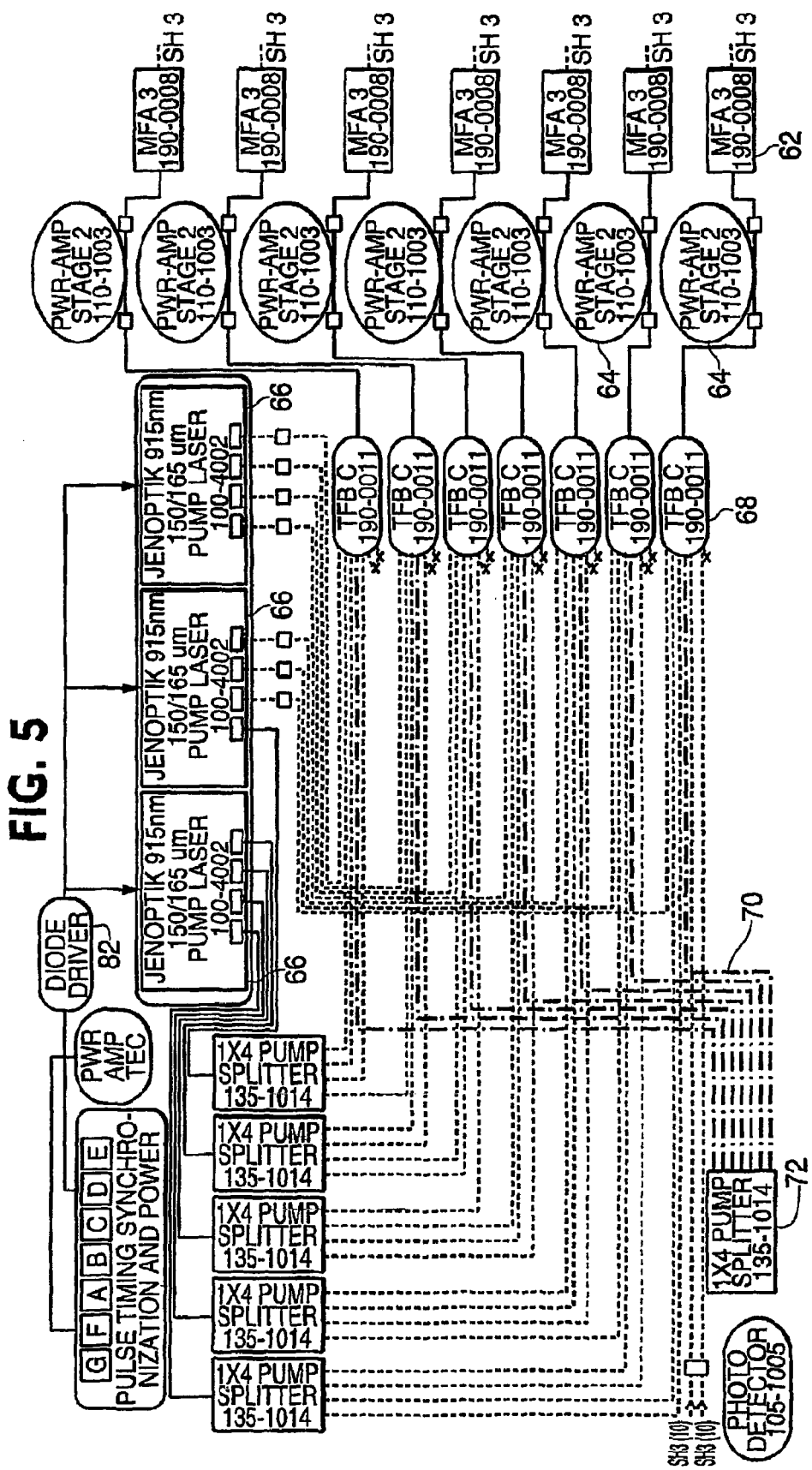

FIG. 5 illustrates stage 2 of the power amplifier, which is the final stage of amplification in the preferred embodiment. Light from the several channels shown in FIG. 4 is coupled to a like number of laser fiber power amplifiers 64 in stage 2 by mode field adaptors 62. The laser fiber amplifiers 64 preferably comprise 115 μm core, 350 μm cladding fibers. The mode field adaptors 62 match the 30 μm diameters of the fibers connecting the first and second power amplifier stages to the 115 μm diameters of the fiber amplifiers 64.

Pumping light from diode lasers 66 is provided to the second stage power amplifiers 64 through tapered fiber bundles 68. Diode lasers 66 preferably operate at 915 nm and 200 W and produce a plurality of output channels that are directed to the TFB 68.

The output beams from the power amplifiers 64 are directed along output fibers 70 to a beam combiner 72, which represents the output of the system.

Figure 6:
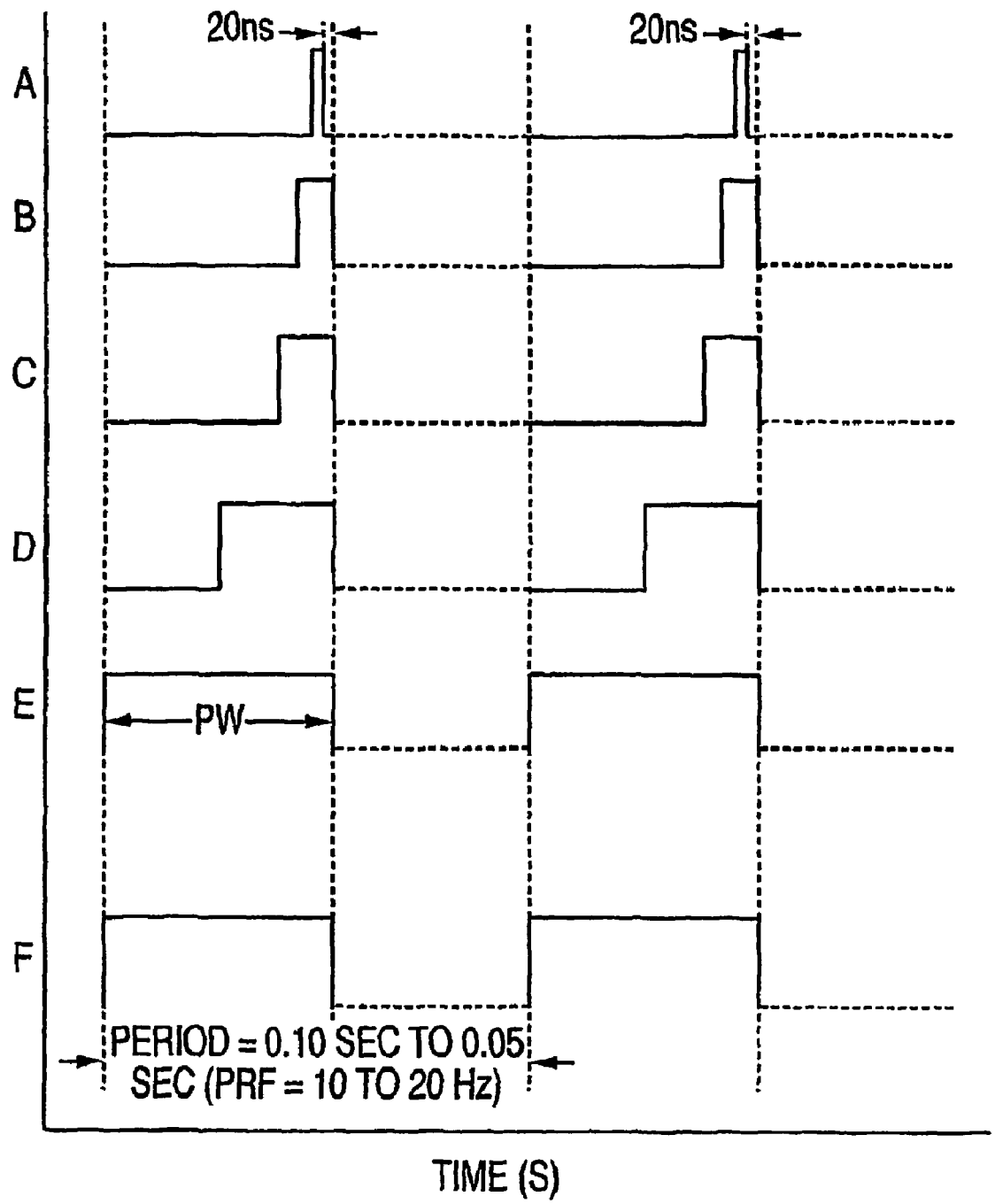
FIG. 6 is a graph illustrating pulse timing in accordance with the invention.

FIG. 6 illustrates the preferred timing for the system described above. Channel A shows the pulse provided by control circuit 24 to the seed diode driver 74 that controls the seed diode 4. Channel B represents the signal provided to the diode driver 76 that controls the stage one preamplifier pump diodes. Channel C illustrates the signal provided to the AOM 20 in FIG. 3. Channel D illustrates the signal provided to the preamplifier stage 2 diode driver 78 for the pump laser 34. Channel E represents the signal pulses provided to the diode driver 80 for the pump laser 52. Channel F represents the signal pulses provided to the diode driver 82 for the pump lasers 66.

We claim:

1. A fiber laser amplifier comprising:
a seed laser configured to produce a seed pulse at a pulse repetition rate of about 10 Hz to about 100 Hz;
a fiber preamplifier configured to receive and amplify the seed pulse, said fiber preamplifier having a first core diameter;
a fiber power amplifier comprising a low numerical aperture, coiled clad fiber, having a core diameter larger than said first core diameter; and
a coupler configured to couple said fiber preamplifier to said fiber power amplifier.

2. The fiber laser amplifier according to claim 1, wherein said low numerical aperture is between about 0.06 and 0.08.

3. The fiber laser amplifier according to claim 1, further comprising a tapered fiber bundle connected to a cladding of said fiber power amplifier configured to direct pump energy into said cladding.

4. The fiber laser amplifier according to claim 1, further comprising:
a first pumping device configured to pump said fiber preamplifier,
a second pumping device configured to pump said fiber power amplifier, and
a synchronizing device configured to synchronize the seed pulse with said pumping devices.

5. The fiber laser amplifier according to claim 1, further comprising one or more additional power amplifiers, wherein the core diameter each additional power amplifier increases with each subsequent power amplifier stage.

6. A method comprising:
producing a seed pulse with a pulse repetition rate of about 10 Hz to about 100 Hz;
amplifying the seed pulse using a fiber preamplifier having a first core diameter; and
amplifying the amplified seed pulse using a fiber power amplifier that is coupled to the fiber preamplifier and that comprises a low numerical aperture, coiled clad fiber, having a second core diameter, the second core diameter being larger than the first core diameter.

7. The method of claim 6, further comprising:
pumping the fiber preamplifier using a first pumping device;
pumping the fiber power amplifier using a second pumping device; and
synchronizing the seed pulse with the first and second pumping devices.

8. The method of claim 6, further comprising:
directing pump energy into a cladding of the fiber power amplifier using a tapered fiber bundle.

9. A pulsed fiber laser comprising:
a seed laser configured to produce a seed pulse at a pulse repetition rate of about 10 Hz to about 100 Hz;
a first amplifier configured to receive and amplify the seed pulse, the first amplifier having a first core diameter;
a second amplifier comprising coiled clad fiber having a second core diameter, the second core diameter being larger than the first core diameter; and
a coupler configured to couple the first and second amplifiers;
wherein core diameters of the second amplifier and subsequent amplifiers increase with each subsequent amplifier stage.

10. The pulsed fiber laser of claim 9, further comprising a tapered fiber bundle connected to a cladding of the second amplifier configured to direct pump energy into the cladding.

11. The pulsed fiber laser of claim 9, further comprising:
a first pumping device configured to pump the first amplifier,
a second pumping device configured to pump the second amplifier, and
a synchronizing device configured to synchronize the seed pulse with the pumping devices.

12. The pulsed fiber laser of claim 9, wherein the fiber of the second amplifier comprises a low numerical aperture.

* * * * *

UNITED STATES PATENT AND TRADEMARK OFFICE
CERTIFICATE OF CORRECTION

| | | |
|---|---|---|
| PATENT NO. | : 8,270,441 B2 | Page 1 of 1 |
| APPLICATION NO. | : 12/815057 | |
| DATED | : September 18, 2012 | |
| INVENTOR(S) | : Rogers et al. | |

It is certified that error appears in the above-identified patent and that said Letters Patent is hereby corrected as shown below:

Column 6
Line 18, Claim 5, please replace "core diameter each additional power" with --core diameter of each additional power--.

Signed and Sealed this
Thirteenth Day of November, 2012

David J. Kappos
*Director of the United States Patent and Trademark Office*